(12) United States Patent
Krishnamachari et al.

(10) Patent No.: US 8,610,996 B2
(45) Date of Patent: Dec. 17, 2013

(54) TUNABLE MULTIPLE LASER PULSE SCANNING MICROSCOPE AND METHOD OF OPERATING THE SAME

(75) Inventors: Vishnu Vardhan Krishnamachari, Mannheim (DE); William C. Hay, Heppenheim (DE)

(73) Assignee: Leica Microsystems CMS GmbH, Wetzlar, DE (US)

( * ) Notice: Subject to any disclaimer, the term of this patent is extended or adjusted under 35 U.S.C. 154(b) by 655 days.

(21) Appl. No.: 12/775,395

(22) Filed: May 6, 2010

(65) Prior Publication Data

US 2011/0273768 A1  Nov. 10, 2011

(51) Int. Cl.
*G02F 1/11* (2006.01)

(52) U.S. Cl.
USPC ............................................ 359/285; 359/385

(58) Field of Classification Search
USPC ......... 359/368–389, 298, 237–240, 285–287, 359/304–314, 362, 577–579, 634; 356/301; 250/201.3, 458.1, 459.1, 461.1, 467.1
See application file for complete search history.

(56) References Cited

U.S. PATENT DOCUMENTS

| | | | |
|---|---|---|---|
| 6,195,167 B1 | 2/2001 | Reid et al. | |
| 6,269,206 B1 * | 7/2001 | Simon et al. | ............ 385/31 |
| 6,441,356 B1 * | 8/2002 | Mandella et al. | ........ 250/201.3 |
| 6,804,000 B2 * | 10/2004 | Roorda et al. | ............ 356/318 |
| 6,967,764 B2 | 11/2005 | Birk | |

* cited by examiner

*Primary Examiner* — Stephone Allen
*Assistant Examiner* — Tamara Y Washington
(74) *Attorney, Agent, or Firm* — Schlee IP International, P.C.; Alexander R. Schlee

(57) ABSTRACT

A tunable multiple laser pulse scanning microscope and a method of operating the same is described, applying two pulsed laser beams with distinct wavelengths incident on a scanning spot of a sample to be imaged simultaneously or at a specific time delay. The microscope comprises at least two pulsed laser light sources emitting laser light of distinct wavelengths, an acousto-optic tunable filter (AOTF) for tuning at least one of the laser pulses, a delay stage provided upstream of the AOTF, and an actuator for moving delay stage depending on the time delay. As a result, the wavelength of at least one type of pulses is tuned, and the delay between at least two pulses of distinct wavelengths is adjusted.

12 Claims, 4 Drawing Sheets

TUNABLE MULTIPLE LASER PULSE SCANNING MICROSCOPE AND METHOD OF OPERATING THE SAME

BACKGROUND OF THE INVENTION

Microscopes applying pulsed laser beams are well-known in the art, particularly, confocal microscopes using two or more pulsed laser beams of distinct wavelengths. The two or more laser pulses are temporarily and spatially synchronized and are of different wavelengths. The laser pulses have to arrive at a particular scanning spot on a sample to be imaged either simultaneously or with a specific time delay between the laser pulses of different wavelengths, depending on the particular type of microscope. Examples for microscopes applying two different laser pulses are for instance a coherent anti-Stokes Raman scattering (CARS) microscope, a stimulated Raman scattering (SRS) microscope, a Raman-induced Kerr-effect scattering (RIKES) microscope, a sum-frequency generation (SFG) microscope, and a stimulated emission depletion (STED) microscope. An example for a microscope applying three distinct wavelengths that are incident on the sample with clearly pre-defined time delays or overlap is for instance non-degenerate anti-Stokes Raman scattering (CARS) microscope.

For various applications of these types of microscopes, it is desirable to select the transmitted wavelength of one or more of the laser pulses of distinct wavelengths. It is well known that acousto-optic tunable filters (AOTFs) can be used for selecting wavelengths. A radiofrequency is applied to the AOTF crystal transmitting the respective laser pulse of a particular wavelength, and by changing the radiofrequency only a particular wavelength of the laser light that correlates to the particular, changed radiofrequency is transmitted through the crystal.

One specific property of AOTFs is that laser pulses of different central wavelengths propagating through the AOTF experience different time delays, i.e. propagate at different speeds through the AOTF. In other words, two laser pulses of different wavelengths experiencing different effective refractive indices hence emerge at different times from the AOTF. The amount of temporal "walk-off" depends on the wavelength separation between the two laser beams. For the above-mentioned microscopes, two or more pulsed laser beams, however, have to arrive at a given time delay or temporal overlap at the sample to generate a strong signal. This time delay can be either zero or non-zero, but has to be specific for each particular application. Wavelength differences may range from several nanometers to hundreds of nanometers. Tuning at least one of the wavelengths results in a change of the temporal delay between the pulses and therefore may result in non-optimal imaging if the resulting time delay is non-optimal.

SUMMARY OF THE INVENTION

It is an object of the invention to provide a tunable multiple laser pulse scanning microscope allowing tuning the wavelength of at least one of the laser pulses and in addition allowing tuning a specific temporal delay between two laser pulses of different wavelengths. This temporal delay may be either zero or non-zero.

It is further an object of the invention to provide a method for operating the aforementioned tunable multiple laser pulse scanning microscope such that the wavelength of at least one of the laser pulses is tuned while also tuning the time delay between the two laser pulses to a specific value. Depending on the specific application and type of microscope, this time delay may be either zero or non-zero.

According to the present invention, this is achieved by a tunable multiple laser pulse scanning microscope applying two pulsed laser beams with distinct wavelengths incident on a scanning spot of a sample to be imaged simultaneously or at a specific time delay, comprising: a first pulsed laser light source providing a first laser pulse of a first distinct wavelength; a second pulsed laser light source providing a second laser pulse of a second distinct wavelength; an acousto-optic tunable filter (AOTF) for tuning at least one of the first and second laser pulses; a delay stage provided upstream of the acousto-optic tunable filter for delaying the at least one of the first and second laser pulses; a delay detector for detecting a time delay between the first and second laser pulses downstream of the acousto-optic tunable filter; and an actuator for moving the delay stage depending on the time delay detected by the delay detector.

According to a first inventive method for operating the microscope of the present invention, the method comprises: turning on the first and the second pulsed laser light sources; tuning the wavelength of one of the first and second laser pulses to the desired wavelength; detecting a time delay between the first and the second laser pulses by the delay detector and generating a delay signal representing this time delay; processing the delay signal for generating a control signal for moving the delay stage; moving the delay stage according to the control signal; and imaging the sample.

It is to be understood that the invention is not restricted to pulses of two different wavelengths only, but may apply to three or more wavelengths. An example for a microscope applying three distinct wavelengths that are incident on the sample with clearly pre-defined time delays is for instance a non-degenerate coherent anti-Stokes Raman scattering (CARS) microscope. For this purpose, the microscope can comprise two delay stages and three laser light sources. These three laser light sources do not necessarily require 3 different lasers, but can also be created by one or two lasers in combination with one or more optical parametric oscillators splitting the emitted laser light into an idler and a signal wavelength. An inventive method for operating a microscope involving laser pulses of three different wavelengths comprises turning on the first and the second pulsed laser light sources and turning off the third pulsed laser light source; tuning the wavelength of the second laser pulse to the desired wavelength; detecting a time delay between the first and the second laser pulses by the delay detector and generating a first delay signal representing this time delay; processing the first delay signal for generating a first control signal for moving the first delay stage; moving the first delay stage according to the first control signal; turning on the first and the third pulsed laser light sources and turning off the second pulsed laser light source; tuning the wavelength of the third laser pulse to the desired wavelength; detecting a time delay between the first and the third laser pulses by the delay detector and generating a second delay signal representing this time delay; processing the second delay signal for generating a second control signal for moving the second delay stage; moving the second delay stage according to the second control signal; and turning on the first, second and third pulsed laser light sources imaging the sample.

This method can be in analogy expanded to four or more laser pulses of distinct wavelengths, where for instance in a first step laser light source 1 and 2 are turned on while laser light sources 3 and 4 are turned off, then laser light sources 1 and 3 turned on while laser light sources 2 and 4 are turned off, and then laser light sources 1 and 4 are turned on while laser light sources 2 and 3 are turned off. In case the time delays between the laser pulses are measured by a TPA detector, only one TPA detector is necessary that can detect the various time delays between the first and the other laser light sources in the aforementioned consecutive steps. Imaging then takes place after the positions of all delay stages have been set, in this example having 4 laser light sources after the positions of 3 delay stages have been set.

DETAILED DESCRIPTION OF THE INVENTION

The simplest way of adjusting the position of one or more delay stages is by moving the stage manually while monitoring the quality of a microscopic sample image. However, a better performance is achieved by measuring the delay between the pulses and adjusting the position of the delay stage according to a position that can be read from a look-up table. This table consists of relevant parameters, for instance, the wavelength of the tuned pulses, the type of microscopy to be applied, and considers the characteristics of the AOTF. Alternatively, the measurement can be performed for a specific set of wavelengths and the characteristic delay at other wavelengths is calculated and adjusted.

In addition, the delay stage can be motorized and a control can be provided for controlling the motorized delay stage depending on the time delay detected by a delay detector. This allows even a closed loop control in that a control unit receives a delay signal from the TPA detector, and generates a control signal for moving the delay stage, resulting in a different time delay that is again detected by the TPA detector, resulting again in generating a control signal in the control unit that is fed to the driving mechanism of the delay stage and therefore results in another feedback by measuring the now again adjusted time delay, etc. The control unit may be a simple CPU or a commercially available personal computer PC. While detectors other than TPA detectors are applicable, these TPA detectors have been found to be particularly appropriate for ultrafast laser applications, and are cost-effective and robust, particularly when designed as a LED-based TPA detector.

The TPA detector can be fed with a picked sample of the laser pulses by a beam splitter provided downstream of the acousto-optic tunable filter that extracts a part of a beam to the delay detector. Preferably, this beam splitter diverts about 5% of an intensity of the first and second laser pulses downstream from the acousto-optic tunable filter to the delay detector, allowing 95% of the intensity to be incident onto the sample for imaging the same. A picked intensity of 5% has turned out to be a sufficient amount for properly detecting the time delay between the laser pulses, while any picked intensity between 1 and 10% would work, i.e. even a lower percentage of the intensity might suffice, while higher intensities can also be tolerated or even useful.

The first pulsed laser light source includes a first laser and the second pulsed laser light source includes a second laser. Preferably, these laser light sources are designed to emit prechirped laser beams. In the alternative, the first and the second pulsed laser light source may comprise one pump laser combined with an optical parametric oscillator converting the pump laser light into the first and second laser pulses of distinct wavelength. This latter alternative is particularly robust and cost-efficient since it requires only one laser, saving the costs for the second laser and at the same time reducing the risk of failure to only one laser.

According to a further preferred embodiment, a first dichroic is spatially splitting the first and second laser pulses upstream of the delay stage; and a second dichroic is recombining the first and second laser pulses downstream from the delay stage. According to this embodiment, only one type of laser pulses, for example the first laser pulses, are transmitted through the AOTF and tuned, while the other, i.e. second laser pulses, bypass the AOTF entirely and are spatially recombined downstream of the AOTF. Therefore, the acousto-optic tunable filter is a single channel acousto-optic tunable filter and only one of the first and second laser pulses is transmitted through this acousto-optic tunable filter. In the alternative, the acousto-optic tunable filter is a multi-channel acousto-optic tunable filter and both the first and the second laser pulses are transmitted through the acousto-optic tunable filter.

Preferably, the tunable multiple laser pulse scanning microscope according to the present invention is a confocal microscope, but the invention is also applicable to other types of microscopes, for instance line scanning microscopes. Particularly for confocal microscopes, preferred applications are in the form of coherent anti-Stokes Raman scattering (CARS) microscopes, stimulated Raman scattering (SRS) microscopes, Raman-induced Kerr-effect scattering (RIKES) microscopes, a sum-frequency generation (SFG) microscopes, and a stimulated emission depletion (STED) microscopes.

DETAILED DESCRIPTION OF THE DRAWINGS

Figure 1:
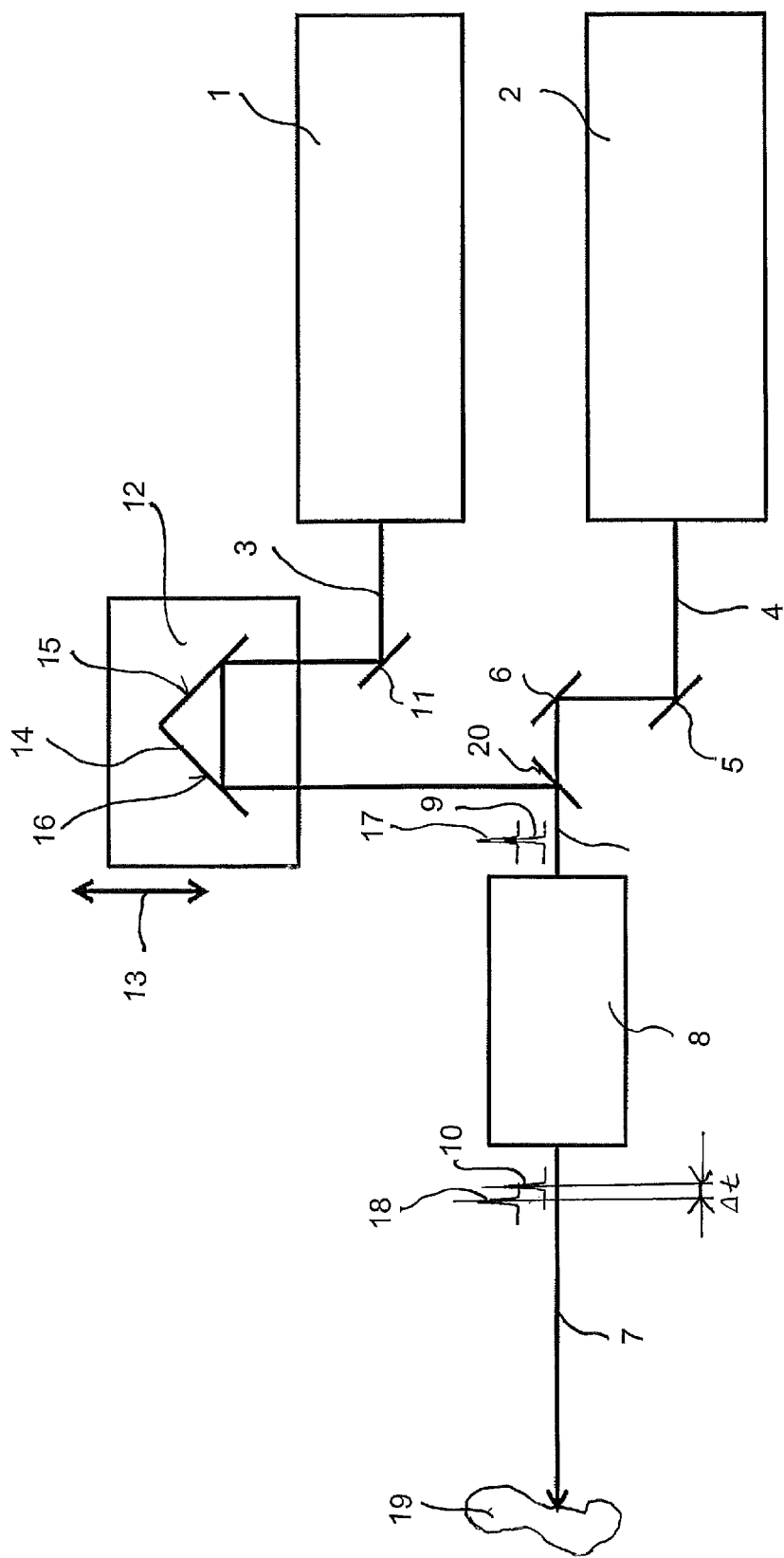
FIG. 1 shows schematically a first embodiment of the invention applying a manual adjustment of the delay stage.

FIG. 1 shows the basic design of a first embodiment of the invention. This embodiment comprises a first laser 1 and a second laser 2. Both lasers are preferably pulsed lasers, but it is also possible to use continuous wave lasers and combine these with a pulse generator for converting the continuous laser light into pulsed laser light. The laser light emitted by the first laser 1 comprises a first wavelength, and the laser light emitted by the second laser 2 comprises a second wavelength that distinguishes from other first wavelength. The beam path for the laser light emitted by the first laser 1 is denoted with reference numeral 3, and the beam path of the laser light emitted by the second laser 2 is denoted 4. The beam paths 3 and 4 might be coinciding with an optical axis 7 of a AOTF 8, or as shown in FIG. 1 can be offset from the optical axis 7 and deflected by mirrors 5 and 6 such as to coincide with the optical axis 7 of the AOTF just prior to entry into said AOTF. In this embodiment, the AOTF is designed as a multi-channel AOTF, transmitting the laser light coming from both the first laser 1 and the second laser 2. A laser pulse coming from the second laser 2 at the input side of the AOTF is denoted with reference numeral 9, and at the output side of the AOTF with reference numeral 10, while input and output is taking place along the optical axis 7 of the AOTF.

In parallel, a laser pulse emitted by the first laser 1 along the optical beam path 3 is deflected by the mirror 11 into a movable delay stage 12 that is movable back and forth as indicated by the arrow 13. The delay stage 12 comprises a reflective element 14, in this embodiment comprising two reflective surfaces 15 and 16 enclosing a 90 degree angle there between. This allows a beam incident on the surface 15 to be reflected onto the reflective surface 16 and from there back into the opposite direction, but with a lateral offset and parallel to the beam incident on the reflective surface 15. Moving the delay stage along the arrow 13 extends or shortens the entire length of the beam path between the first laser 1 and the AOTF, and therefore delays arrival of the laser pulse that originated from the first laser 1. If the entire beam path is made longer, this allows the laser pulse to arrive at the AOTF later and accordingly to arrive at the AOTF earlier if made shorter. The beam path of the beam coming from the delay stage 12 and the beam path coming from the mirror 6 can be merged by means of a dichroic 20 allowing a laser pulse coming from the mirror 6 and originating from the second laser 2 to pass the dichroic 20, while the laser pulse originating from the first laser 1 and coming from the delay stage 12 is reflected at a 90 degree angle into the beam path 7.

In the schematically shown embodiment, for demonstrating the function of the delay stage 12, the position of the delay stage 12 is adjusted such that the laser pulse 17 coming from the first laser 1 arrives at the input side of the AOTF 8 at the same time as the laser pulse 9 originating from the first laser 1. Since the laser pulse 9 and laser pulse 17 are of different wavelengths, these propagate at different speeds through the AOTF 8, so that according to the present example, the laser pulse 18 from the laser light from the first laser 1 arrives at the output side of the AOTF earlier than the laser pulse 10 that originated from the second laser 2. The time delay between of the resulting laser pulse 10 coming from the second laser 2 and the resulting laser pulse 18 coming from the first laser 1 is denoted with $\Delta t$. The two laser pulses 10 and 18 are incident on the sample 19. For creating a complete image of the sample 19, the sample is scanned as known in the art from typical scanning microscopes, for instance confocal scanning microscopes.

Depending on the specific microscope such as coherent anti-Stokes Raman scattering (CARS) microscope, a stimulated Raman scattering (SRS) microscope, a Raman-induced Kerr-effect scattering (RIKES) microscope, a sum-frequency generation (SFG) microscope, and a stimulated emission depletion (STED) microscope and depending on the parameters of the specific application such as wavelengths or differences in wavelength between the two different pulses a particular time difference and $\Delta t$ between the two pulses yields the best imaging results. The best time difference depending on the aforementioned factors might be zero or non-zero but is in any case specific. The most simple adjustment of $\Delta t$ is a mechanism allowing to move the delay stage 12 along the arrow 13 manually, for instance by means of a rotatable adjustment knob actuating a transmission that moves the delay stage 12 upon rotating the adjustment knob. The best position for the delay stage 12 can be achieved by viewing the image while adjusting of the position of the delay stage 12. In the alternative, the delay $\Delta t$ can be measured by a separate, external detector and the optimal position of the delay stage can be read from a table depending on the particular application parameters. The adjustment of the delay stage can then be performed manually, adjusting the position to a position that is read from a look-up table. In the alternative, the adjustment can be made by a powered actuator in form of an open loop control.

Figure 2:
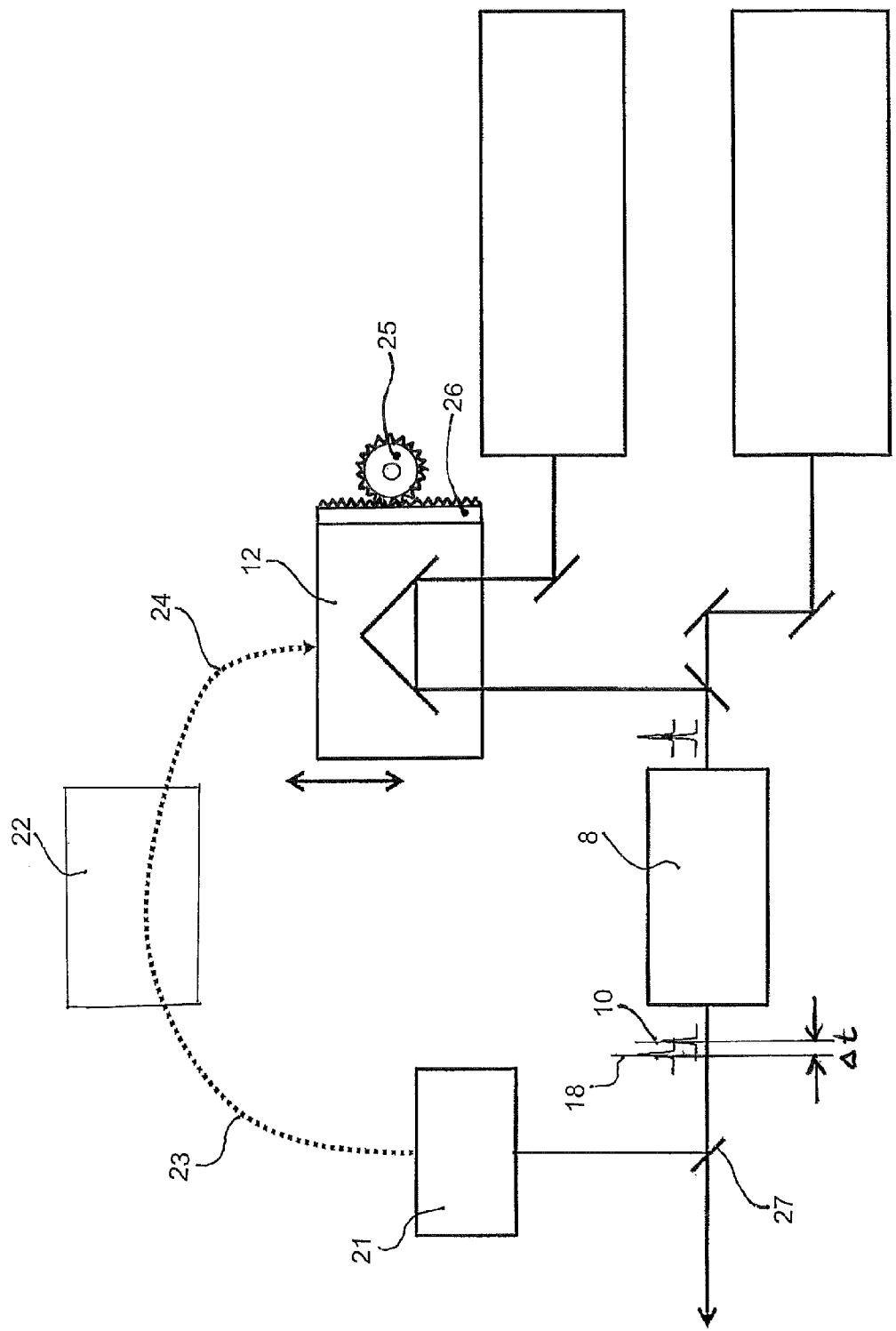
FIG. 2 shows schematically a second embodiment of the invention applying a controlled adjustment of the delay stage.

FIG. 2 demonstrates a more advanced embodiment as to the adjustment of the delay stage 12. In addition to the embodiments shown in FIG. 1, the embodiment in FIG. 2 comprises a delay detector 21. In this particular embodiment, the delay detector 21 is designed as an LED-based two-photon absorption detector, often referred to by the acronym TPA. Even though other types of detectors may be used, TPA detectors have the advantage of being simple and inexpensive and enable construction of sturdy and cost-effective auto-correlators for ultrafast laser applications. This TPA detector can detect the delay $\Delta t$ between the laser pulses 10 and 18, generate a signal representing this delay $\Delta t$, and send this signal to a control unit 22 via a delay signal line 23. This control unit 22 can be any control unit capable of processing the delay signal input through delay signal line 23, and output a control signal through a control signal line 24. The delay stage 12 may be motorized, and for instance moved by a stepping motor combined with an appropriate transmission mechanism, here demonstrated by a gear wheel 25 meshing with a toothed rack 26. Other appropriate driving mechanisms might include a worm gear.

The TPA detector may be fed with a sample laser pulse via a beam splitter 27 having a 5% reflection rate and a 95% transmission rate often referred to as a 95% (T)-5% (R) beam splitter, diverting only 5% of the intensity of the laser pulses 10 and 18 downstream from the AOTF 8 into the TPA detector 21. A comparatively low light intensity is needed as the TPA detector only needs to detect the time delay $\Delta t$ between the two pulses 10 and 18. The embodiment shown in FIG. 2 allows a closed loop control and therefore fine-tuning of the delay $\Delta t$ as a controlled variable that is fed back in the closed control loop. The control unit 22 may be a simple central processing unit CPU, or maybe a commercially available personal computer PC configured to perform the desired control steps. For the purpose of control, a calibration table can be pre-stored on the PC finding the optimal position of the delay stage corresponding to the wavelength and the tunable laser source. In general, this calibration procedure needs to be done only once for a particular model of the AOTF and constitutes group delay characteristics of the AOTF crystal. If the group-delay characteristics are known, this step can be even completely avoided and the appropriate data can be stored into the calibration table avoiding the need for performing a calibration procedure.

Figure 3:
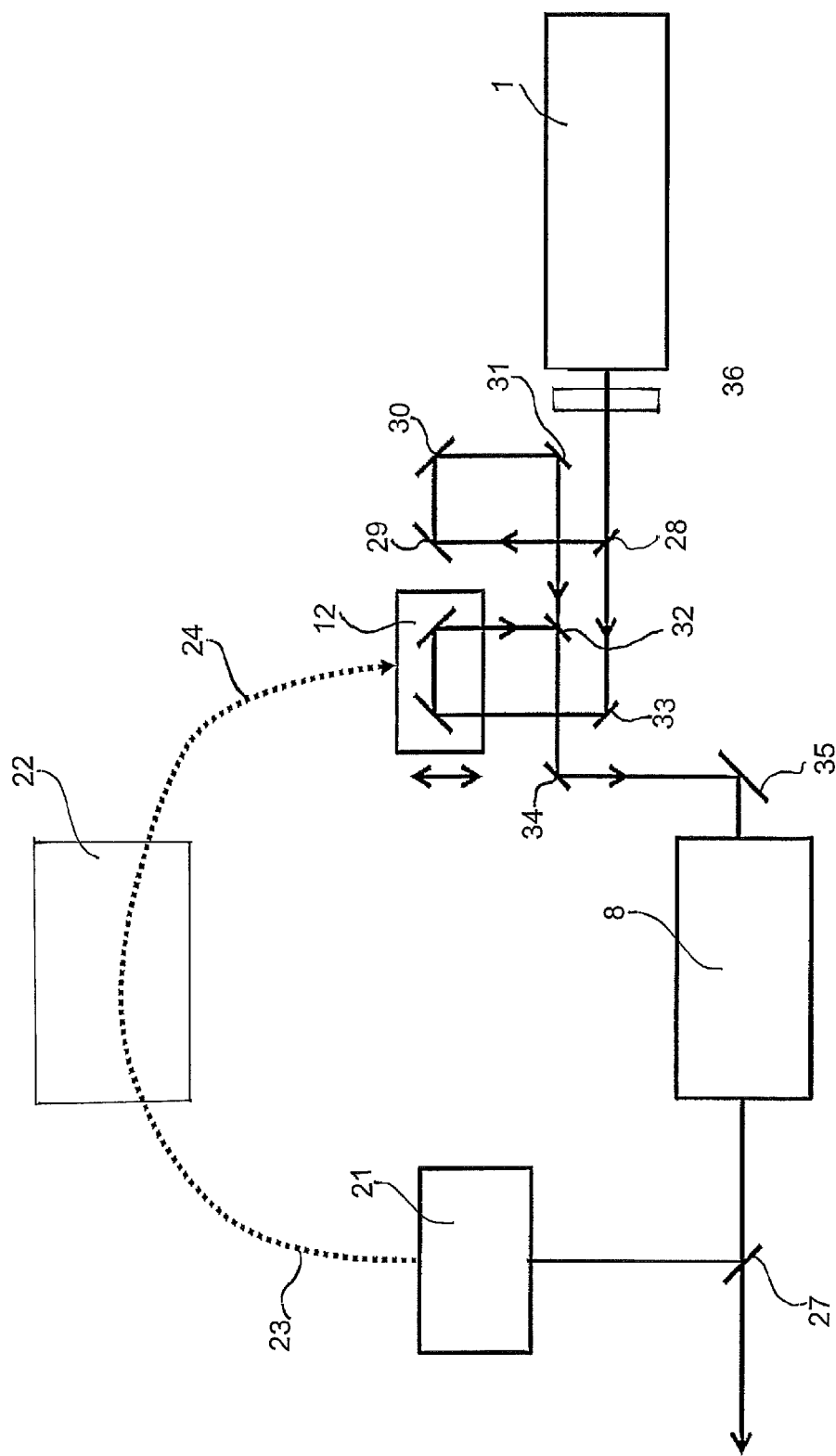
FIG. 3 shows schematically a third embodiment of the invention applying a controlled adjustment of the delay stage and comprising only one single laser source with two output wavelengths.

FIG. 3 shows a variation of the embodiment shown in FIG. 2, managing to have only one single laser 1. The laser light emitted by the laser 1 is split into laser pulses of two different wavelengths by an optical parametric oscillator 36 splitting the emitted laser light into laser light having an "idler" wavelength and laser light have a "signal" wavelength. These resulting laser light pulses of these two different wavelengths are spatially split using the dichroic 28. The set of pulses corresponding to, say, the "signal" wavelength is guided by an arrangement of mirrors 29, 30 and 31 to a dichroic 32 recombining the spatially split pulses, while the other set of pulses corresponding to, say, the idler wavelength is guided upstream of the recombining dichroic 32 via mirror 33 into the delay stage 12 and then recombined by the aforementioned dichroic 32. Another arrangement of the mirrors 34 and 35 guides the two laser pulses along the same beam path into the AOTF 8. The remaining elements are the same as in the embodiment shown in FIG. 2, including the beam splitter 27, TPA detector 21, delay signal line 23, control unit 22, and control signal line 24. To keep the drawing simple, elements of the driving mechanism driving the motorized delay stage 12 are omitted in FIG. 3, but are to be understood the same as in the embodiment shown in FIG. 2.

Figure 4:
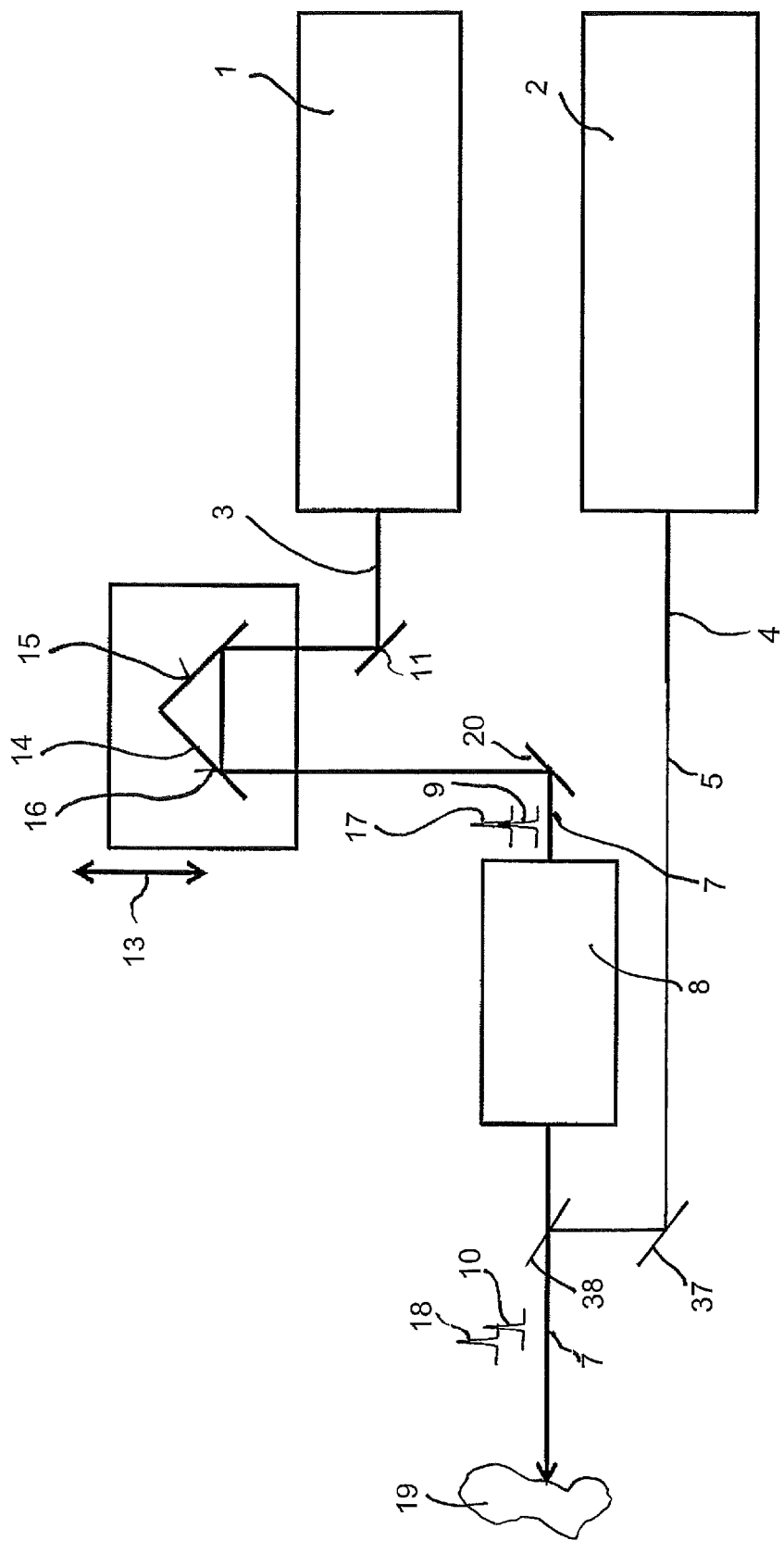
FIG. 4 shows schematically a fourth embodiment of the invention applying a manual adjustment of the delay stage and only one wavelength being transmitted and tuned through the AOTF.

FIG. 4 shows another variation of the aforementioned embodiment, for simplicity shown as a variation of the embodiment shown in FIG. 1. However, it is to be understood that the same variation can also be applied to the embodiments shown in FIGS. 2 and 3 involving a motorized delay stage 12 combined with a control. In the embodiment shown in FIG. 4, the laser pulses generated by the first laser 1 follow the exact same path through the delay stage 12 into the AOTF 8 as in the embodiment shown in FIG. 1. However, the laser pulses generated by the second laser are not guided through the AOTF 8 at all, but are recombined downstream of the AOTF 8 with the then tuned output pulses that originated as untuned pulses from the first laser 1 and have been tuned by the AOTF 8. In this case, the recombination is achieved by a mirror 37 and a dichroic 38, the latter recombining the two laser pulses 10 and 18 downstream of the AOTF 8. In this embodiment, wherein only one of the wavelengths, namely the laser pulses originating from the first laser 1, is tuned, it is particularly easy to implement a control since only the specification of the AOTF 8 needs to be known as to the speed the laser light propagates through the AOTF 8 depending on the wavelength, and depending on the particular application, the delay stage position can be pre-stored depending on the wavelength of the tuned laser pulses. In this case, not even a closed loop feedback control is necessary; a simple open loop control would suffice since all parameters for determining the optimum delay are known.

LIST OF REFERENCE NUMERALS 1 first laser
2 second laser
3 beam path of first laser
4 beam path of second laser
5 mirror
6 mirror
7 optical axis
8 AOTF
9 laser pulse at AOTF input side
10 laser pulse at AOTF output side
11 mirror
12 delay stage
13 arrow
14 reflective element
15 reflective surface
16 reflective surface
17 laser pulse at AOTF input side
18 laser pulse at AOTF output side
19 sample
20 dichroic
21 delay detector
22 control unit
23 delay signal line
24 control signal line
25 gear wheel
26 toothed rack
27 beam splitter
28 dichroic
29 mirror
30 mirror
31 mirror
32 dichroic
33 mirror
34 mirror
35 mirror
36 optical parametric oscillator
37 mirror
38 dichroic

What is claimed is:

1. A tunable multiple laser pulse scanning microscope applying at least two pulsed laser beams with distinct wavelengths incident simultaneously or at a specific time delay on a scanning spot of a sample to be imaged, comprising:
a first pulsed laser light source providing a first laser pulse of a first distinct wavelength;
a second pulsed laser light source providing a second laser pulse of a second distinct wavelength;
an acousto-optic tunable filter (AOTF) for tuning at least one of the first and second laser pulses sent through the acousto-optic tunable filter;
a delay stage provided one of upstream of the acousto-optic tunable filter and in parallel to the acousto-optic tunable filter for delaying the at least one of the first and second laser pulses; and
an actuator for moving the delay stage depending on the time delay between the first and second laser pulse downstream of the acousto-optic tunable filter.

2. The tunable multiple laser pulse scanning microscope according to claim 1, wherein the actuator is motorized and a control is provided for controlling the motorized actuator depending on the time delay.

3. The tunable multiple laser pulse scanning microscope according to claim 1, further comprising a delay detector for detecting a time delay between the first and second laser pulses downstream of the acousto-optic tunable filter.

4. The tunable multiple laser pulse scanning microscope according to claim 3, further comprising a beam splitter provided downstream of the acousto-optic tunable filter that extracts a part of a beam to the delay detector.

5. The tunable multiple laser pulse scanning microscope according to claim 1, wherein the first pulsed laser light source includes a first laser and the second pulsed laser light source includes a second laser.

6. The tunable multiple laser pulse scanning microscope according to claim 1, wherein the first and the second pulsed laser light source comprise one pump laser combined with an optical parametric oscillator converting the pump laser light into the first and second laser pulses of distinct wavelength.

7. The tunable multiple laser pulse scanning microscope according to claim 6, further comprising:
a first dichroic spatially splitting the first and second laser pulses upstream of the delay stage; and
a second dichroic recombining the first and second laser pulses downstream from the delay stage.

8. The tunable multiple laser pulse scanning microscope according to claim 1, wherein the microscope is a confocal microscope.

9. The tunable multiple laser pulse scanning microscope according to claim 8, wherein the microscope is one from the group consisting of: a coherent anti-Stokes Raman scattering (CARS) microscope, a stimulated Raman scattering (SRS) microscope, a Raman-induced Kerr-effect scattering (RIKES) microscope, a sum-frequency generation (SFG) microscope, and a stimulated emission depletion (STED) microscope.

10. The tunable multiple laser pulse scanning microscope according to claim 1, wherein the acousto-optic tunable filter is a single channel acousto-optic tunable filter and only one of the first and second laser pulses is transmitted through the acousto-optic tunable filter.

11. The tunable multiple laser pulse scanning microscope according to claim 1, wherein the acousto-optic tunable filter is a multi-channel acousto-optic tunable filter and both the first and the second laser pulses are transmitted through the acousto-optic tunable filter.

12. The tunable multiple laser pulse scanning microscope according to claim 3, wherein the delay detector is designed as an LED-based two-photon absorption (TPA) detector.

* * * * *